April 19, 1927.
D. W. BEECHTEL
TIRE VALVE
Filed July 23, 1925
1,624,914
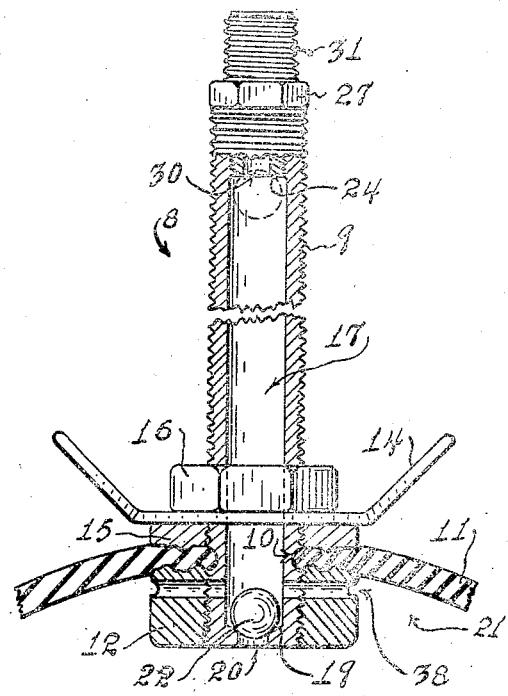
Fig.1.
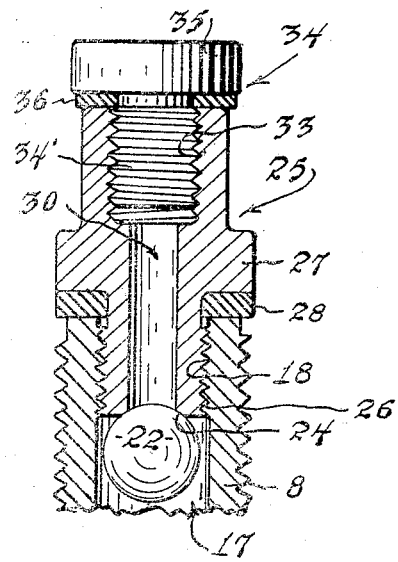
Fig.3.
Fig.4.
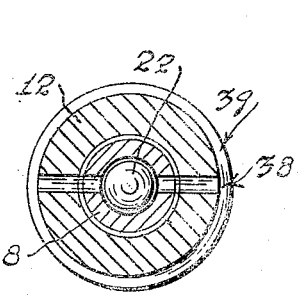
Fig.2.
David W. Beechtel,
INVENTOR.
BY
ATTORNEY.

Patented Apr. 19, 1927.

1,624,914

UNITED STATES PATENT OFFICE.

DAVID W. BEECHTEL, OF LOS ANGELES, CALIFORNIA, ASSIGNOR OF FORTY-NINE PER CENT TO MARVIN L. ARNOLD, OF LOS ANGELES, CALIFORNIA.

TIRE VALVE.

Application filed July 23, 1925. Serial No. 45,445.

The present invention relates to air valves for pneumatic tires and for inflatable articles, and has for its principal object the provision of a valve of extreme simplicity.

Another object of the invention is to do away with rubber valves, gaskets and the like, inasmuch as such parts are rapidly deteriorated by contact with the air.

It will be understood in the consideration of the invention that the usual tire valves are quite complicated and include an expensive renewable core or insert, which in itself embodies a multiplicity of parts. It is another object of the invention to provide an extremely simple valve that will outwear several tires and tubes, and in which the inside does not have to be renewed.

Still another objection to present types of inflation valves is that in using a hand pump, or any other device, to inflate a tire, the valve is continually pounded against its seat and is soon destroyed. It is therefore another object of the invention to provide a valve which will tend to remain in one position when air is being forced through it, so that it does not pound on its seat.

It is also found in using a hand pump that the extremely small area of flow through the valve, together with the spring tension imposed on the valve, greatly increases the air resistance and as a consequence much energy is wasted in operating the pump. It is therefore a further object of the invention to provide a valve in which the maximum area for flow of air is provided, and in which valve no springs or the like are use or required.

Many other objects and advantages of the invention will appear hereinafter.

I have illustrated my invention by the accompanying drawings in which,

Figure 1 is a view, on enlarged scale, of a tire valve constructed in conformance with my invention.

Figure 2 is a section thereof on a line 2—2 of Fig. 1.

Figure 3 is a further enlarged detail section of the upper end of the valve shown in Fig. 1.

Figure 4 is a plan view of the assembly shown in Fig. 3.

In carrying out my invention in the embodiment illustrated, I provide a hollow valve stem 8, externally threaded, as at 9, throughout its entire length. At 10 a portion of the metal and threads is cut away to provide a reduced neck adapted to be closely encompassed by the rubber of the inner tube 11, to which the valve is attached.

The lower end of the stem is fitted with a button or disc 12 into which the lower end of the stem is screw threaded. The stem and button are so arranged that the rubber of the tube overlies the joint between the threaded stem and the button, and in that manner the rubber precludes leakage through any clearance which may exist at that point.

The assembly of parts shown includes the usual tube guard 14, having an attached disc 15, which coacts with the disc 12, to hold the assembly securely to the tube in a manner to prevent leakage in any direction. By means of the usual nut 16, the disc 15 carried by the guard is clamped tightly on the rubber and is held relative to the other disc. The friction of the rubber practically precludes the guard from turning with regard to the stem, and accordingly the stem is of full round cross section throughout its length so that it is of maximum strength.

The valve stem shown is the smaller size commonly used, the smaller size being selected to show the comparatively large area of air flow provided by my improved valve. The bore 17, of the stem, is as large as possible without weakening the stem, and said bore is smooth except at the upper end where it is internally threaded, as at 18. The bore terminates in a seat 19, adjacent the lower end and within the limits of the lower disc. From said seat a smaller bore 20 continues to bring the smaller bore 17 into communication with the interior space 21, of the inner tube.

In conformance with a salient feature of my invention there is provided, in the bore 17, a full floating valve member 22. Various forms of valve members may be used, but in the embodiment shown said valve member is in the form of a ball 23, which is only slightly smaller in diameter than the bore 17. The upper end of the valve stem is provided with an upper seating surface 24.

The valve member or ball is adapted to seat on either seat, and the upper seat is so designed that, when the ball is held against it, escape of air from the bore of the stem is shut off. Various means may be employed to provide the seat, but in the embodiment shown, said seat is carried by a removable nipple 25, having threads 26 on its lower end, whereby it may be screwed into the upper end of the valve stem. Intermediate of the nipple there is provided a polygonal section 27, adapted to be engaged by a wrench or pliers (not shown) to securely tighten the nipple with regard to the valve stem. A gasket 28, of lead or other soft metal, is interposed between the section 27 and the stem to prevent leakage. The nipple is provided with a small bore 30. The upper end of the nipple, as at 31, is threaded externally for the receipt of a hose of a tire pump (not shown). The upper end of the nipple is also internally threaded, as at 33, for the receipt of an improved valve closure or cap 34. The cap includes a head 35, adapted to hold a gasket 36, between itself and the upper end of the nipple, so that even should air escape by the ball and seat it will not be lost. The nipple acts to retain the ball or valve member in place, and said ball is free to float between the upper and lower seats, respectively.

In Fig. 1 it is assumed that air is entering the tube through the valve stem, whereas Fig. 3 it is assumed that air is seeking to escape and is holding the ball firmly up against the seat. In conformance with a salient feature of the invention the lower disc is provided with a pair of air courses or drilled holes 38, which establish communication between the interior of the tube and the bore 27, at a point above the lower ball seat. The combined area of the small drilled holes 38 should be less than the area of the bore 30, so that when air is escaping through the drilled holes 38, the pressure within the inner tube will be appreciably higher than the pressure in the bore 17.

In the use and operation of the device shown, the ball will be held up against the upper seat as shown in Fig. 3, by the air pressure below it, unless of course, the pressure above it has equalized with the pressure below, in which case it will fall to the lower seat. However, regardless of the position of the ball, when the closure is in place, the fact remains that as soon as the cap is loosened or removed, air will rush from the tube through the holes 38 and through the small bore 20 at the bottom of the stem. Owing to the fact that the pressure in the bore of the stem is less than the inner tube, air in rushing out will lift the ball. After the ball has been raised above the small holes 38, all the outcoming air will act to force the ball to the upper seat. This movement of the ball to the upper seat is almost instantaneous. The ball now acts to hold the air, with the cap or closure removed.

Assuming that it is desired to further inflate the tube, the upper end of the valve stem is connected with the pump hose, or compressed air hose (not shown). Immediately air enters from such hose the ball drops and remains down below the holes 38. Air will flow freely through the large air course to the holes 38, and thence laterally into the tube without resistance on the part of the valves, springs or the like. Immediately the hose or pump is disconnected, the outrush of air will raise the ball and shut off leakage. When the cap is applied the pressure above the ball may, by virtue of a slight leak equalize with the pressure below it, in which case the ball will drop. The position of the ball in either case is quite immaterial since the cap can be depended upon, but if the cap is not used, the ball will hold the air. Owing to the movements of the ball and the force with which it seats, the ball and seat will be kept in good condition and the ball will tend to seat firmly and well.

The device shown is applicable to inflated bladders, and the like, for punching bags, foot balls, water wings, air cushion seats, and all like equipment requiring to be inflated. The stem, in the case of foot balls, punching bags, and the like, may be just as short as possible or permissable, inasmuch as no long valve cores, springs, stems, and the like are used.

While I have shown and described a specific embodiment of my invention, I do limit myself to any specific construction or arrangement of parts, and may alter same as I desire, without enlarging the scope of my invention, within the appended claim.

I claim:—

In a pneumatic tire valve, a stem provided with a vertical bore, an inverted seat adjacent the upper end of said bore provided with a coaxial port, a lower seat adjacent the lower end of said bore provided with a coaxial port, a ball freely disposed in said bore and having a piston like fit in said bore and ports opening laterally outward from said bore at points sufficiently above said lower seat to prevent the ball obstructing same when the ball is seated on the said lower seat.

DAVID W. BEECHTEL.